(12) United States Patent
Cheng (10) Patent No.: US 9,688,007 B2
(45) Date of Patent: Jun. 27, 2017

(54) FOAM MOLDING AND FOAM CUSHION MOLDING METHOD

(71) Applicant: Taiwan Paiho Limited, Ho Mei Town, Chang Hua Hsien (TW)

(72) Inventor: Allen Cheng, Chang Hua Hsien (TW)

(73) Assignee: Taiwan Paiho Limited, Ho Mei Town, Chang Hua Hsien (TW)

( * ) Notice: Subject to any disclaimer, the term of this patent is extended or adjusted under 35 U.S.C. 154(b) by 309 days.

(21) Appl. No.: 14/676,055

(22) Filed: Apr. 1, 2015

(65) Prior Publication Data

US 2015/0202808 A1   Jul. 23, 2015

Related U.S. Application Data

(63) Continuation-in-part of application No. 13/770,741, filed on Feb. 19, 2013, now abandoned.

(30) Foreign Application Priority Data

Nov. 19, 2012  (TW) .............................. 101143041 A (51) Int. Cl.
| B29C 44/12 | (2006.01) |
| A44B 18/00 | (2006.01) |
| B29K 105/04 | (2006.01) |
| B29L 31/00 | (2006.01) |

(52) U.S. Cl.
CPC ...... *B29C 44/1271* (2013.01); *A44B 18/0076* (2013.01); *B29K 2105/04* (2013.01); *B29L 2031/729* (2013.01); *Y10T 24/27* (2015.01)

(58) Field of Classification Search
CPC ....................... B29C 44/1271; B29C 44/1276
See application file for complete search history.

(56) References Cited

U.S. PATENT DOCUMENTS

| 5,554,239 | A | 9/1996 | Datta et al. |
| 5,606,781 | A | 3/1997 | Provost et al. |
| 5,786,061 | A | 7/1998 | Banfield |
| 6,463,635 | B2 | 10/2002 | Murasaki |
| 7,373,700 | B2 | 5/2008 | Martin et al. |
| 2003/0131453 | A1 | 7/2003 | Clarner et al. |
| 2010/0139004 | A1 | 6/2010 | Cheng |
| 2014/0130311 | A1* | 5/2014 | Okuda ............... A44B 18/0049 24/449 |

* cited by examiner

*Primary Examiner* — Ryan Ochylski
(74) *Attorney, Agent, or Firm* — Muncy, Geissler, Olds & Lowe, P.C.

(57) ABSTRACT

An adhesive fastener for foam molding and cushion thereof are disclosed herein. The adhesive fastener comprises a strip. The strip comprises a surface with a plurality of first hooks and second hooks. The first hooks are disposed on an adhesive area and the second hooks are disposed on a surrounding area of the adhesive area. The arrange density of the first hooks is greater than the arrange density of the second hooks. Therefore, when the adhesive fastener is used in a foam material cushion, the adhesive and fastening function in the adhesive area is working normally and a combining force between the adhesive fastener and the foam material is performed well.

7 Claims, 11 Drawing Sheets

FOAM MOLDING AND FOAM CUSHION MOLDING METHOD

This application is a Continuation in-part of and claims a priority to the U.S. application Ser. No. 13/770,741 entitled "ADHESIVE FASTENER FOR FOAM MOLDING AND CUSHION THEREOF" filed on Feb. 19, 2013 which claimed a foreign priority of TW 101143041, filed on Nov. 19, 2012.

BACKGROUND OF THE INVENTION

1. Field of the Invention

The present invention is related to an adhesive fastener and more particularly related to an adhesive fastener for foam molding.

2. Description of the Prior Art

The adhesive fastener was conceived by a Swiss engineer. The idea came to him from the burrs (seeds) of burdock. The adhesive fasteners consist of two components: typically, two lineal fabric strips which are attached to the opposing surfaces to be fastened. The first component features tiny hooks; the second features even smaller and "hairier" loops. When the two components are pressed together, the hooks catch in the loops and the two pieces fasten or bind temporarily.

Figure 1A:
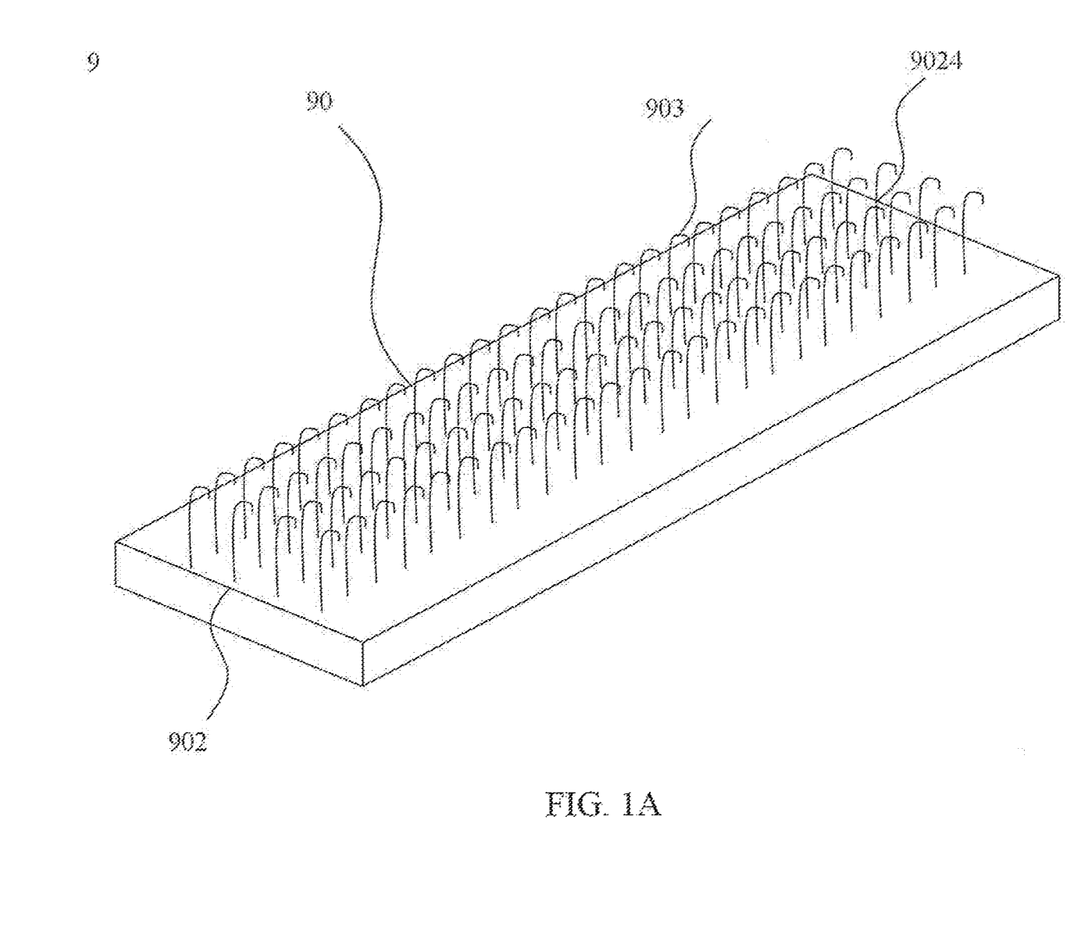
FIG. 1A is a view schematically illustrates a conventional adhesive fastener.

The adhesive fasteners are easy fastened and separated and are usually implemented with other objects in recent years. Please refer to FIG. 1A, which is a view illustrating a conventional adhesive fastener. An adhesive fastener 9 includes a strip 90 and the strip 90 includes a surface 902 and a plurality of hooks 903. The area where hooks 903 located is an adhesive area 9024. When the adhesive fastener 9 is implemented with a foam object, such as a cushion and so on, the hook 903 of the adhesive fastener 9 is faced outside to couple with another object with hair surface and the adhesive fastener 9 and the cushion are fasten together.

Figure 1B:
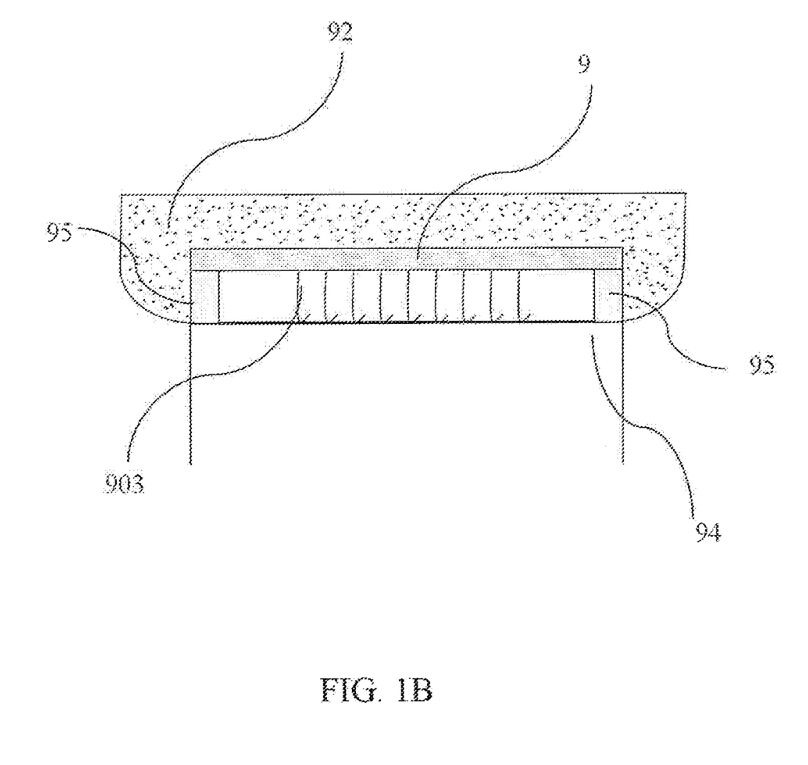
FIG. 1B is a view schematically illustrates a conventional adhesive fastener molded with a foam material in an opening end mold.
Figure 1C:
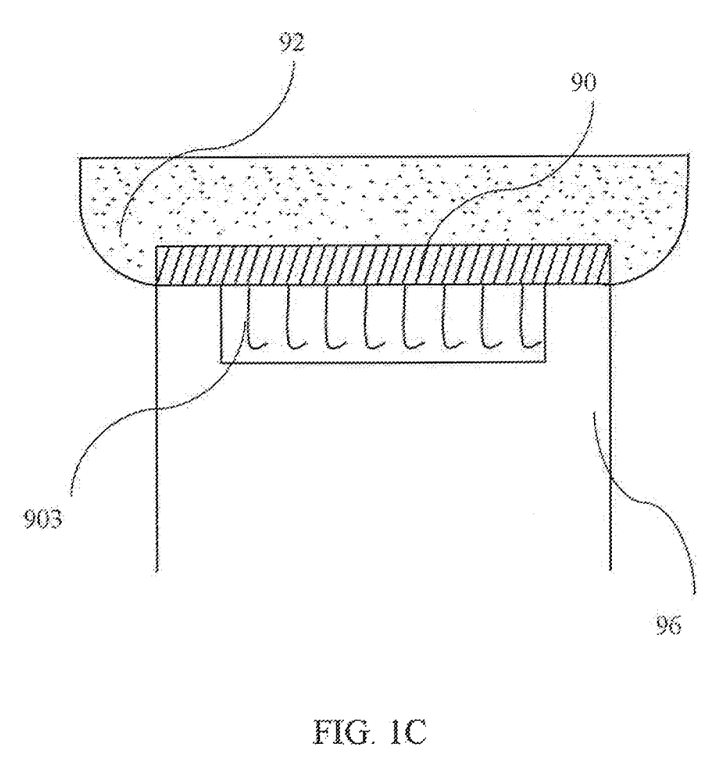
FIG. 1C is a view schematically illustrates a conventional adhesive fastener molded with a foam material in a closed end mold.

Please refer to FIG. 1B, which is a view illustrating a conventional adhesive fastener is forming with a foam material in an opening end mold. The manufacturing method to combine the adhesive fastener and the cushion is described as the following. First of all, in order to avoid the foam material 92 covering the hook 903 to affect the function of the adhesive fastener 9, one side of the adhesive fastener 9 includes a retaining wall 95. The adhesive fastener 9 is disposed within the mold and filled with the foam material 92. When the foam material 92 is solidified, the adhesive fastener 9 and the foam material 92 are forming together. However, if the opening end mold 94 is used, the retaining wall 95 is required to be formed on the adhesive fastener 9 to cause troubles and increase cost. And the adhesive force of the foam material 92 and the adhesive fastener 9 is not enough, so the adhesive fastener 9 is easy to loose from the foam material 92. Please refer to FIG. 1C, which is a view illustrating the conventional adhesive fastener and the foam material are formed and fasten together in the closing mold. When filling with the foam material 92 by using the closing end mold, it can avoid the foam material 92 covering the hook 902 of the adhesive fastener 9, but the adhesive force of the foam material 92 and the hook 903 is still not good enough and the adhesive fastener is easy to loose from the foam material 92. Therefore, it is easy to produce a defective item by the conventional adhesive fastener 9 in the opening end mold or the closing end mold to increase the cost.

According the drawbacks described above, it is necessary to provide an improvement to produce an item with better quality when using the adhesive fastener to produce the cushion with the foam material.

SUMMARY OF THE INVENTION

In order to overcome the drawbacks described above, main object of the present invention is to provide an adhesive fastener for foam molding. The foam material will not be stuck within the adhesive area to cover the hooks and therefore the hooks and the corresponding loop component together can perform binding in a good manner. As a result, a good adhesive force is existed between the foam material and the adhesive fastener.

According to the object above, the present invention provides an adhesive fastener for foam molding, including a strip having a surface;

a plurality of first hooks disposed on a first area of the surface of the strip with a first arranging density; and a plurality of second hooks disposed on a second area of the surface of the strip with a second arranging density. The second area is peripheral to the first area and the second arranging density is greater than the first arranging density.

Moreover, the present invention also provides a cushion with adhesive fastener including a foam body and at least one adhesive fastener, the foam body is formed by a foam material and the adhesive fastener. The foam body includes a concave for disposing the adhesive fastener. The foam material of the foam body is embedded with the peripheral hooks of the adhesive fastener for foam molding.

By the adhesive fastener provided in the present invention, it will have a better yield and the cost can be reduced when using the adhesive fastener to make a cushion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 2:
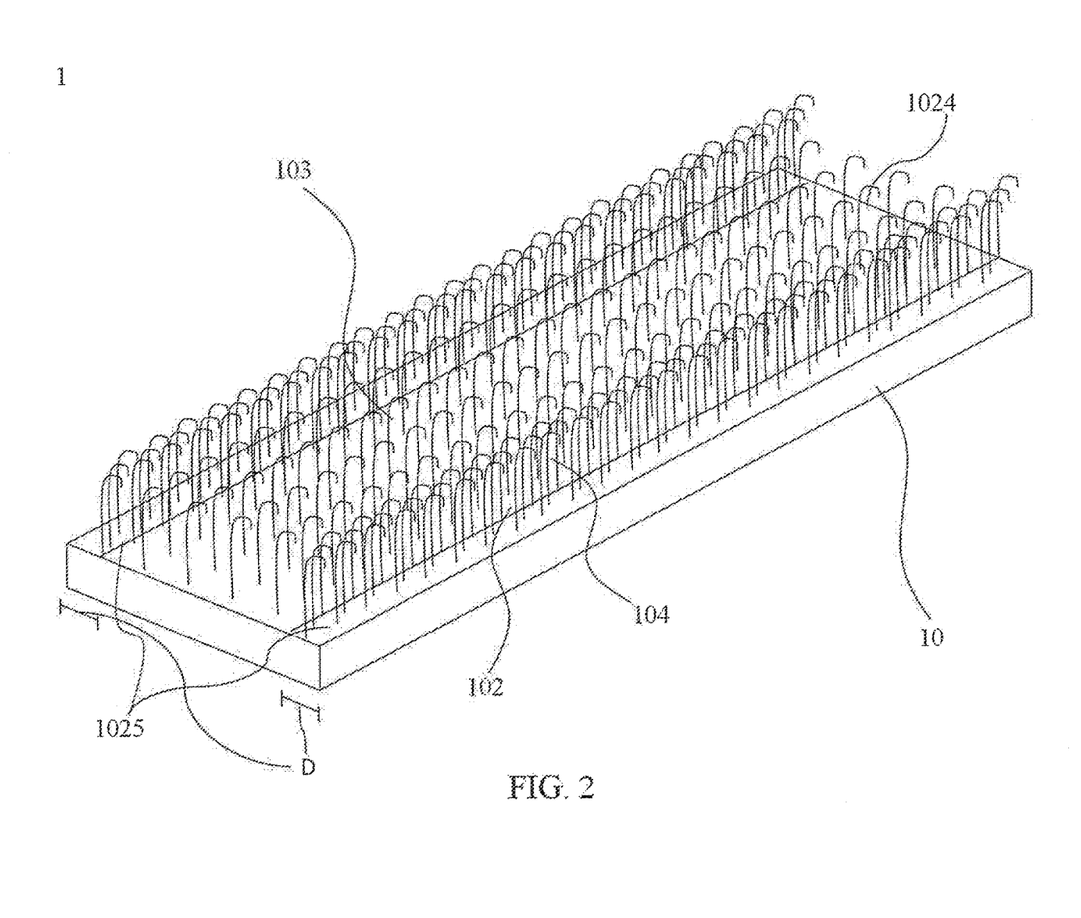
FIG. 2 is a perspective view schematically illustrates an adhesive fastener in a first embodiment of the present invention.

Firstly, please refer to FIG. 2, which is a perspective view illustrating an adhesive fastener molded with a foam material in a first embodiment of the present invention. As shown in FIG. 2, the adhesive fastener 1 includes a strip 10, and the strip 10 includes a surface 102, a plurality of first hooks 103 and a plurality of second hooks 104. The plurality of first hooks 103 are disposed at the middle of the surface 102 to form an adhesive area 1024 and are arranged with a first arranging density. The second hooks 104 are disposed at a surrounding area of the surface 102 and two sides thereof such that each side constitutes a blocking zone 1025. The width D in each of the blocking zone 1025 is 1 mm-3 mm and the plurality of second hooks 104 are arranged with a second arranging density. The first arranging density and the second arranging density are number of hooks per unit area and the second arranging density is greater than the first arranging density.

Figure 3:
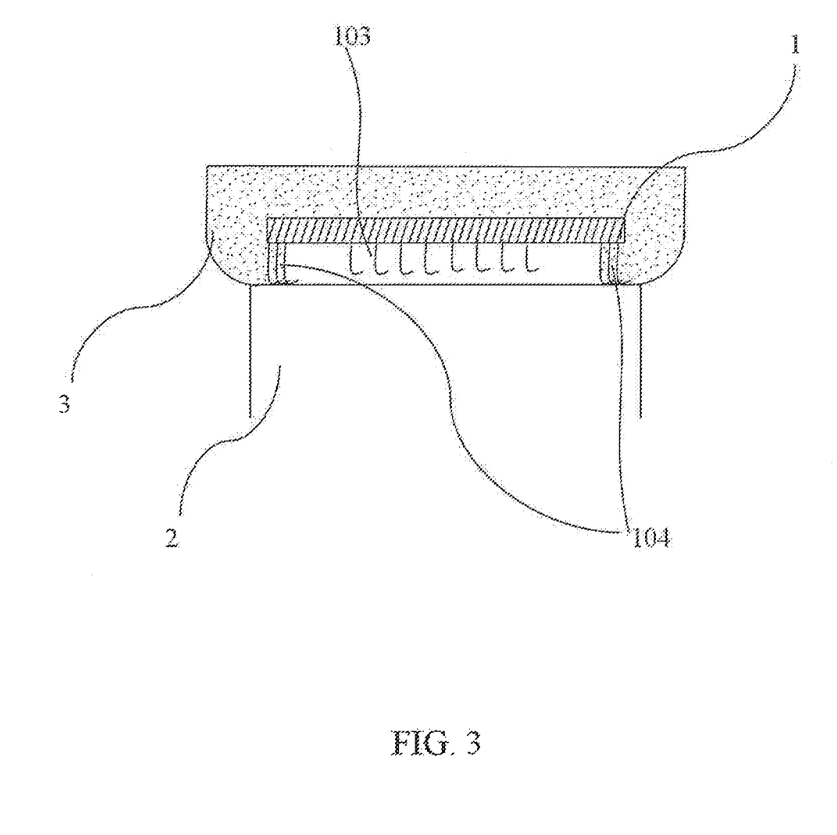
FIG. 3 is a view schematically illustrates molding of the adhesive fastener in the first embodiment of the present invention with the foam material within an opening end mold.

Now, please refer to FIG. 3, which is a view illustrating that the adhesive fastener is molded with the foam material within an opening end mold in the first embodiment of the present invention. As shown in FIG. 3 and FIG. 2, the surface 102 of the adhesive fastener 1 is faced down to dispose on the opening end mold 2 and the liquid of the foam material 3 is filled within the opening end mold 2. During filling with the liquid of the foam material 3, the liquid of the foam material 3 will flow to the blocking zone 1025 and flow a distance, usually about 1 mm-3 mm, on the surface 102. Because stopping by the second hook 104, the foam material 3 will be solidified on the blocking zone 1025 and won't flow to the adhesive area 1024. Therefore, during filling with the liquid of the foam material 3, the function of the first hooks 103 will not be affected by the leakage of the foam material 3 and the first hooks 103 are able to successfully bind with a corresponding hook in future. Moreover, because the liquid of the foam material 3 is stopped by the second hooks 104 and solidified on the blocking zone 1025, the liquid of the foaming material 3 and the second hooks 104 are embedded and interrupted to each other such that the liquid of the foam material 3 is well and firmly adhered to the adhesive fastener 1. In addition, in the practical manner, the height of the first hooks 103 is smaller than the height of the second hooks 104 to avoid that the first hooks 103 are depressed and damaged by the mold.

Figure 4:
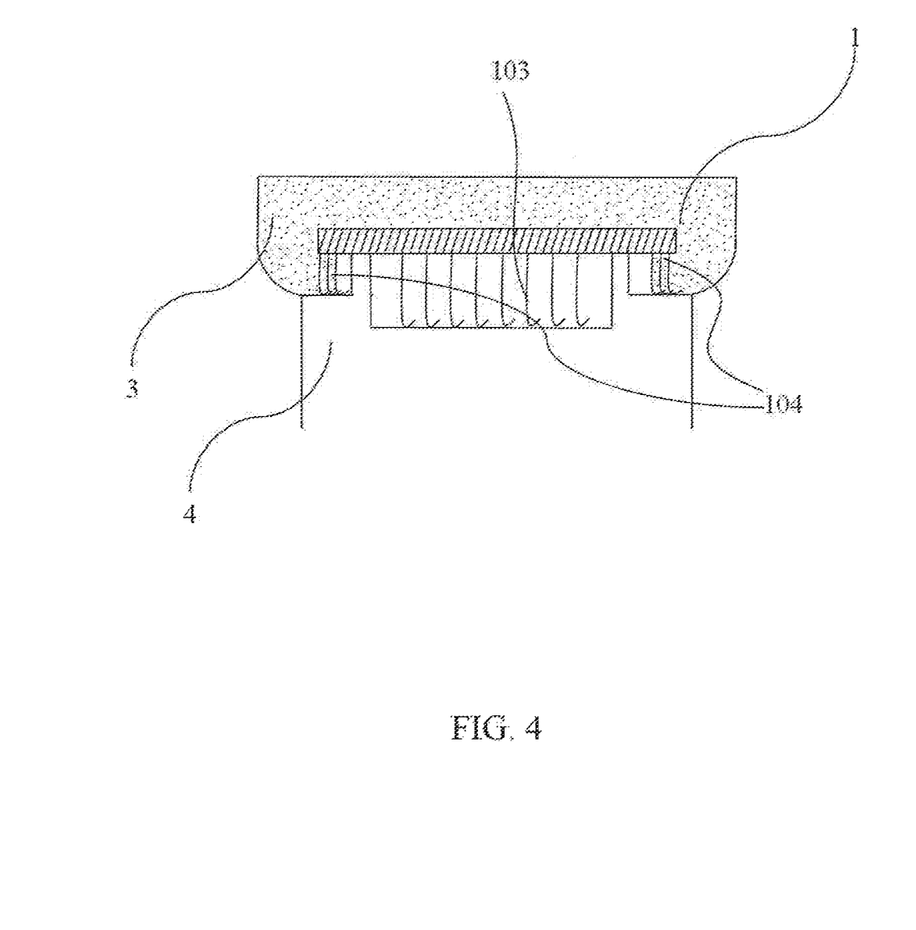
FIG. 4 is a view schematically illustrates molding of the adhesive fastener in the first embodiment of the present invention with the foam material within a closing end mold.

Now, please refer to FIG. 4, which is a view illustrating that the adhesive fastener is molded with material within a closing end mold in the first embodiment of the present invention. As shown in FIG. 4 and FIG. 2, the surface 102 of the adhesive fastener 1 is faced down to dispose on the closing end mold 4 and the liquid of the foam material 3 is filled within the opening end mold 4. During filling with the liquid of the foam material 3, the liquid of the foam material 3 will flow to the blocking zone 1025 and flow a distance, usually about 1 mm-3 mm, on the surface 102. Because stopping by the second hook 104, the foam material 3 will be solidified on the blocking zone 1025 and won't flow to the adhesive area 1024. Therefore, during filling with the liquid of the foam material 3, the function of the first hooks 103 will not be affected by the leakage of the liquid of the foam material 3 and the first hooks 103 are able to success- fully bind with a corresponding hook in future. Moreover, because the liquid of the foam material 3 is stopped by the second hooks 104 and solidified on the blocking zone 1025, the liquid of the foaming material 3 and the second hooks 104 are embedded and interrupted to each other such that the liquid of the foam material 3 is well and firmly adhered to the adhesive fastener 1. In addition, in the practical manner, the height of the first hooks 103 is larger than the height of the second hooks 104 to save the usage of the material of the second hooks 104 and enable the second hooks 104 to have same function as a retaining wall.

Figure 5:
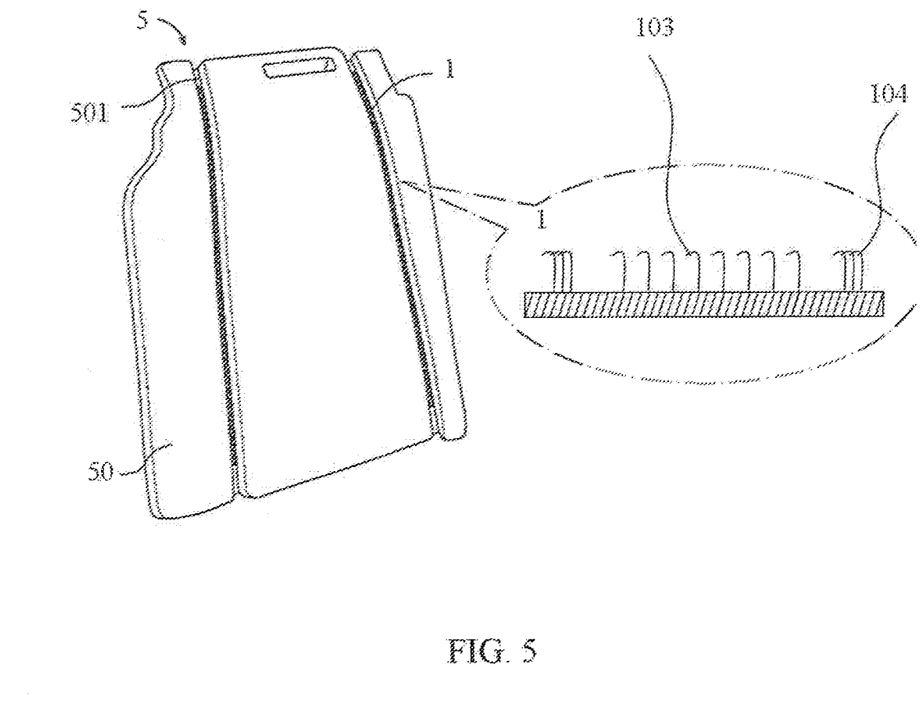
FIG. 5 is a view schematically illustrates a cushion with the adhesive fastener in the first embodiment of the present invention.

Now please refer to FIG. 5, which is a view illustrating a cushion with the adhesive fastener in the first embodiment of the present invention. The cushion 5 includes a foam body 50 and at least one adhesive fastener 1. The foam body 50 and the adhesive fastener 1 are integrally formed. The present adhesive fastener 1 is the same as the adhesive fastener 1 in the previous embodiment and includes the strip 10. Because the characteristics of each of the components and the connection relationship thereof are the same as the previous embodiment, the detail description is omitted herein. For example, the foam body 50 is embedded with the second hooks 104 of the adhesive fastener 1 and the foam body 50 and the second hooks 104 are interrupted to each other.

In addition, in the preferred embodiment, the foam body 50 further includes at least one concave 501 for disposing the adhesive fastener 1 to increase the assembly of the cushion 5 and any other items having corresponding adhesive fastening structure.

Figure 6:
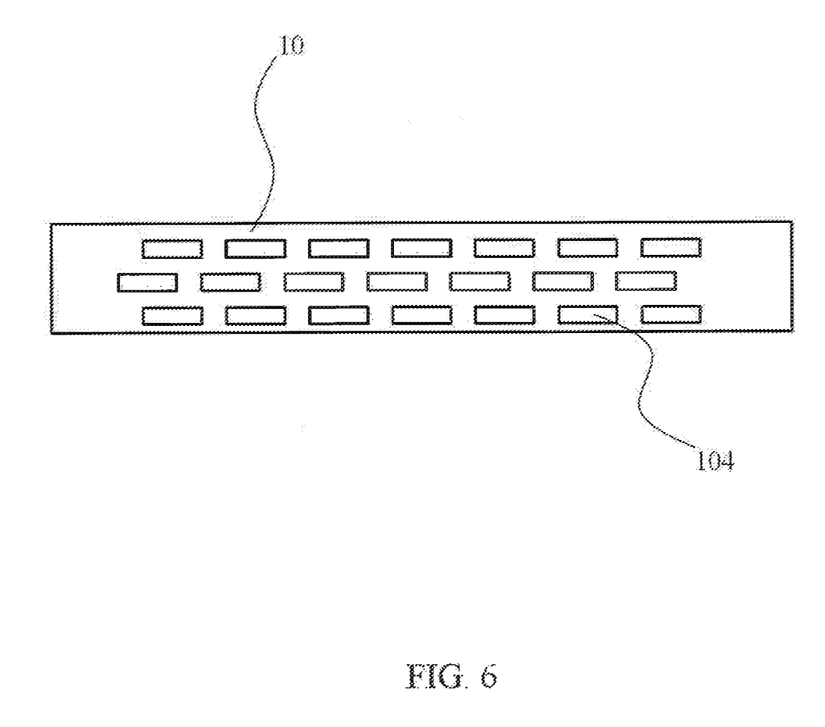
FIG. 6 is a view schematically illustrates arrangement of the hooks on blocking zones of the adhesive fastener in the first embodiment of the present invention.

Now, please refer to FIG. 6, which is a view schematically illustrates arrangement of the second or peripheral hooks 104 on blocking zones 1025 of the adhesive fastener in the first embodiment of the present invention. As shown in FIG. 6, the second hooks 104 are arranged in a parallel and interlaced manner on the strip 10. The second hooks 104 in one row and in the other row are arranged with an offset existed between two rows.

Figure 7:
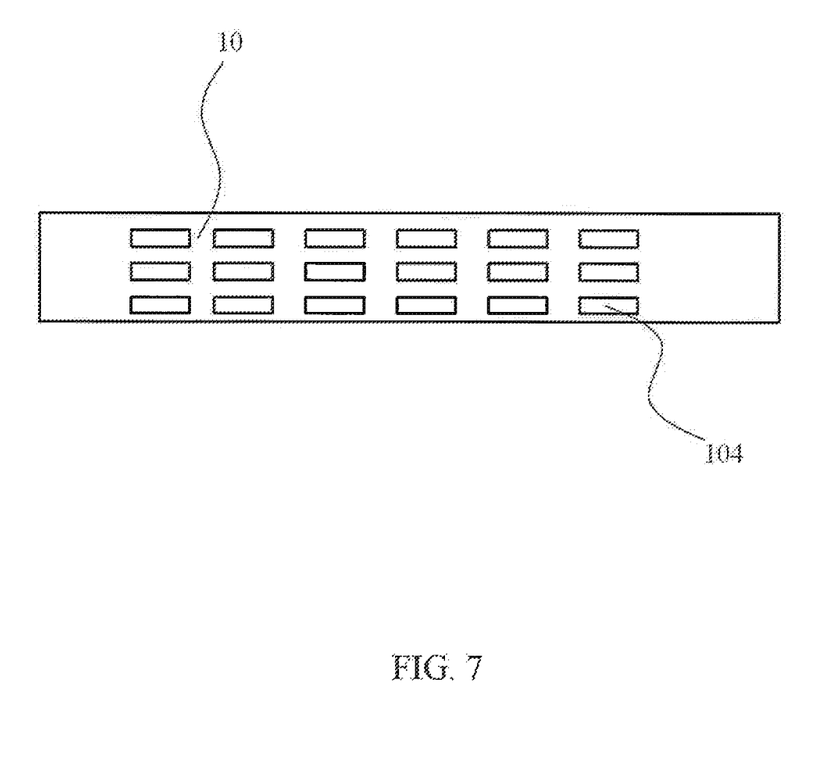
FIG. 7 is a view schematically illustrates arrangement of the hooks on the blocking zones of the adhesive fastener in a second embodiment of the present invention.

Please refer to FIG. 7, which is a view schematically illustrates arrangement of the second or peripheral hooks 104 on blocking zones 1025 of the adhesive fastener in a second embodiment of the present invention. As show in FIG. 7, the second hooks 104' are arranged in a parallel and aligned manner on the strip 10. The second hooks 104' in one row and in the other row are arranged without an offset existed between two rows.

Figure 8:
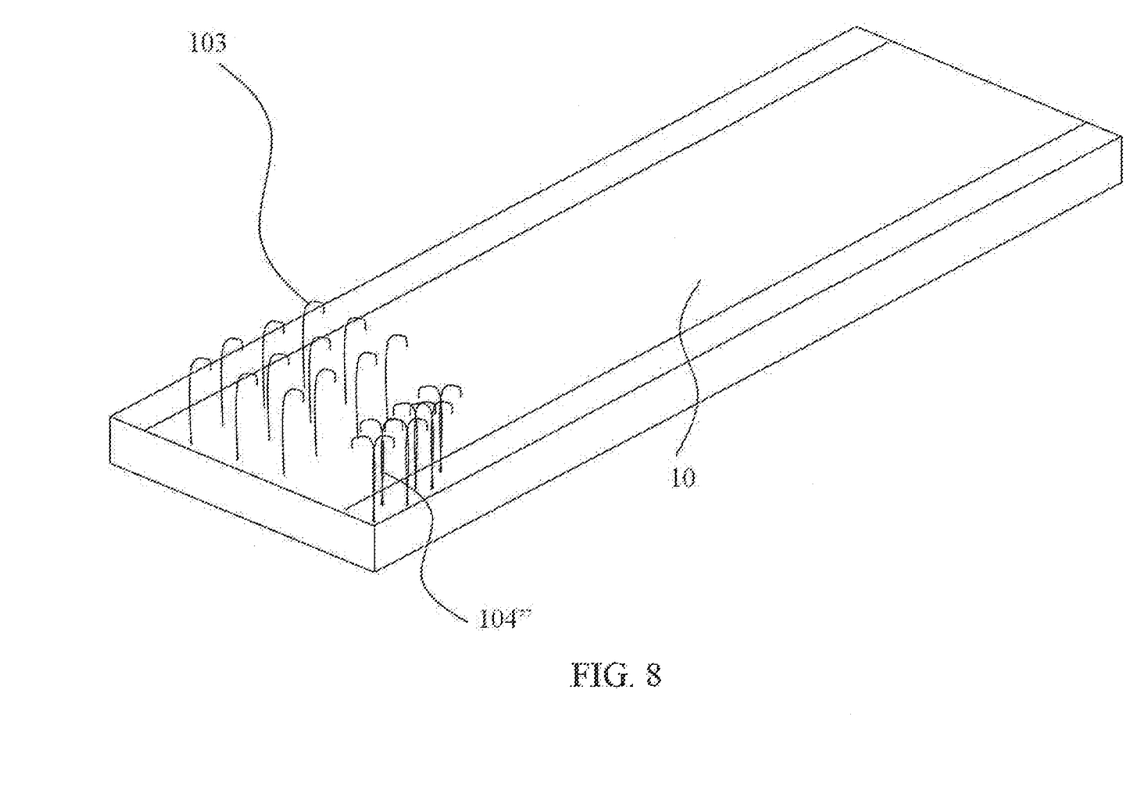
FIG. 8 is a view schematically illustrates shape of hooks disposed at different areas of an adhesive fastener in a third embodiment of the present invention.

Please refer to FIG. 8, which is a view illustrating a hook of the adhesive fastener in third embodiment of the present invention. As shown in FIG. 8, the strip 10 includes the first hooks 103 and the second hooks 104". The shape of the first hook 103 is different from the shape of the second hooks 104". The form of the hooks 103 in the present embodiment is a single hook and the form of the second hooks 104" is a double hook. The second hooks 104" with double hook can strengthen the embedding condition of the foam material.

Figure 9:
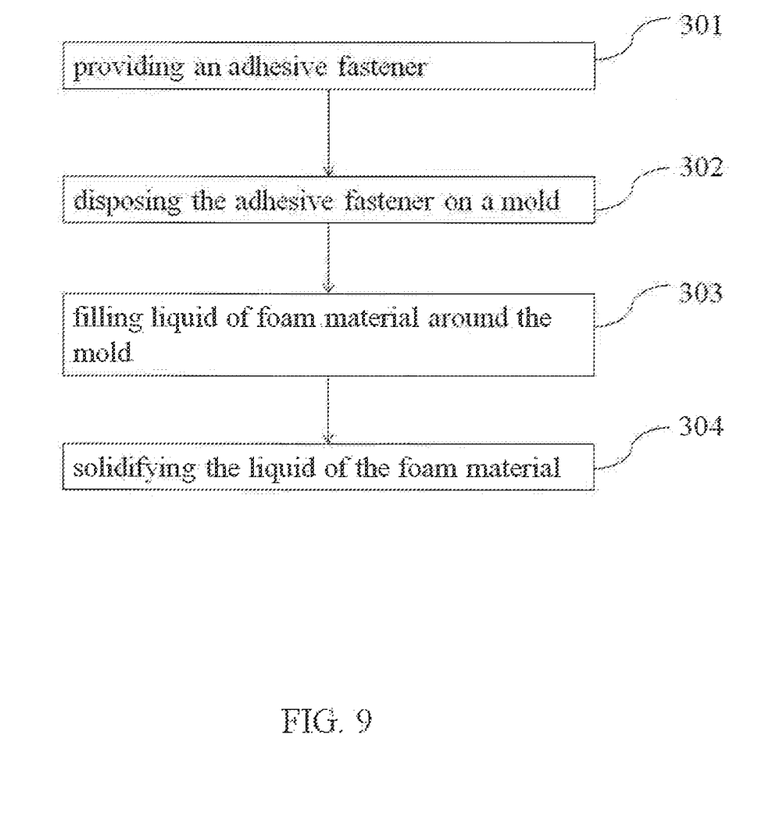
FIG. 9 is a foam molding method of the present invention.

This invention further provides a foam molding method as FIG. 9 shows, the method comprises the steps of:

Step 301: providing an adhesive fastener 1, wherein the fastener 1 includes a strip 10, the strip 10 has a surface 102, while a plurality of first hooks 103 is disposed on a first area of the surface 102 with a first arranging density, and a plurality of second hooks 104 is disposed on a second area of the surface 102 with a second arranging density, in addition, the second area is peripheral to the first area and the second arranging density is greater than the first arranging density.

The forming method of the adhesive fastener 1 can be injection molding.

Step 302: disposing the adhesive fastener 1 on a mold.

The mold in the step 302 can be an opening end mold 2 showed in FIG. 3, or a closing end mold 4 showed in FIG. 4. In the embodiment that the mold is an opening end mold 2, the second hooks 104 can be taller than the first hooks 103, so that when the second hooks 104 are contact with the opening end mold 2, the first hooks 103 is disposed away from the opening end mold 2. In the embodiment that the mold is a closing end mold 4, the height of the second hooks 104 can be shorter than that of the first hooks 103, so that the material usage of the second hooks 104 can be save.

Step 303: filling liquid of foam material 3 around the mold, the liquid of foam material 3 is stopped by the plurality of second hooks 104, the plurality of first hooks 103 is not contact with the liquid of foam material 3.

Step 304: solidifying the liquid of the foam material 3, for the liquid of the foam material 3 is stopped by the second hooks 104, the liquid of the foam material 3 will solidify on the blocking zone 1025 and won't flow to the adhesive area 1024.

By using the adhesive fastener 1 provided in the present invention in the liquid of the foam material 3, the cushion 5 with foam material is made with the adhesive fastener 1 can have a better yield to save the cost.

According to the foam molding method of the present invention, a foam product (for example, the cushion 5) with an adhesive fastener 1 can be produced. The adhesive area 1024 of the foam product can be well performed, and the foam product is able to adhesive with another adhesive fastener securely.

What is claimed is:

1. A foam molding method, comprising:
   providing an adhesive fastener, the fastener includes a strip with a surface, wherein a plurality of first hooks is disposed on a first area of the surface, and a plurality of second hooks is disposed peripherally to the first hooks;
   disposing the adhesive fastener on a mold;
   filling a liquid of a foam material around the mold, the liquid of the foam material is to be stopped by the plurality of second hooks and the plurality of first hooks is not contact with the liquid of the foam material; and
   solidifying the liquid of the foam material fluid;
   wherein the liquid of the foam material is stopped by the second hooks and the first hooks are not contact with the liquid of the foam material.

2. The method of claim 1, wherein the plurality of first hooks is disposed on the first area with a first arranging density.

3. The method of claim 2, wherein the plurality of second hooks is disposed on the second area with a second arranging density.

4. The method of claim 3, wherein the second arranging density is larger than the first arranging density.

5. The method of claim 1, wherein the mold is an opening end mold.

6. The method of claim 1, wherein the mold is a closing end mold.

7. A foam cushion molding method, comprising:
   providing an adhesive fastener, the fastener includes a strip with a surface, wherein a plurality of first hooks is disposed on a first area of the surface, and a plurality of second hooks is disposed peripherally to the first hooks;
   disposing the adhesive fastener on a mold;
   filling a liquid of a foam material around the mold, the liquid of the foam material is to be stopped by the plurality of second hooks and the plurality of first hooks is not contact with the foam material; and
   solidifying the liquid of the foam material to form a cushion;
   wherein the liquid of the foam material is stopped by the second hooks and the first hooks are not contact with the liquid of the foam material.

\* \* \* \* \*